E. A. BARRETT.
Pulley-Blocks.
No. 135,066.
Patented Jan. 21, 1873.
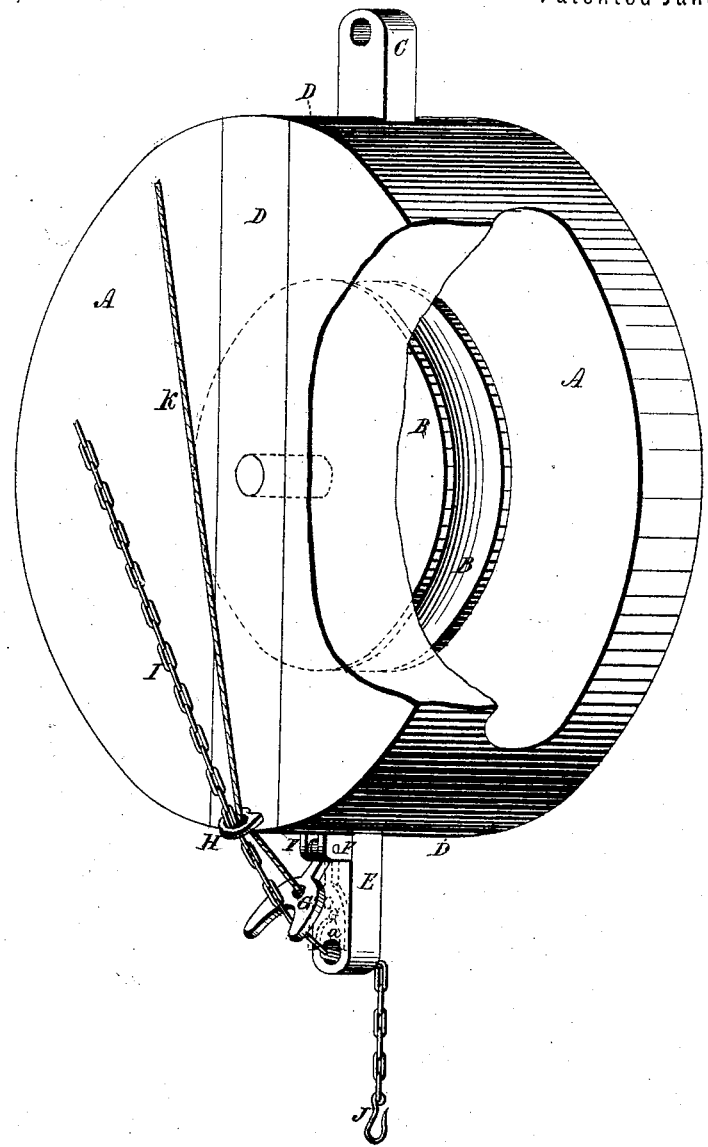
Witnesses
John A. Ellis
C. Alexander
Inventor
Edward A. Barrett
per
C. H. Watson & Co.
Atty's

UNITED STATES PATENT OFFICE.

EDWARD A. BARRETT, OF NEW YORK, N. Y., ASSIGNOR TO HIMSELF AND JOSEPH J. WALTON, OF SAME PLACE.

IMPROVEMENT IN PULLEY-BLOCKS.

Specification forming part of Letters Patent No. 135,066, dated January 21, 1873.

*To all whom it may concern:*

Be it known that I, EDWARD A. BARRETT, of the city, county, and State of New York, have invented certain Improvements in Boats' Lower-Fall Blocks, which are simple in construction, efficient in use, and durable in operation.

The object of my invention is to improve the devices now used to attach a block to a sunken vessel or an anchor when under water, or used for any like purpose, by reducing the number of parts heretofore used in such devices, and furnish an attachment at the bottom of the block which will automatically clamp the chain, and which can be released at pleasure; and it consists in forming from the block band or strap a perforated rigid arm at the bottom, and combining therewith a hinged slotted pawl, chain, and trip-line, as hereinafter more fully described and pointed out by the claim; and I do hereby declare that the following is a full, clear, and exact description thereof, which will enable others skilled in the art to which it appertains to make and use the same, reference being had to the accompanying drawing, with the letters of reference marked thereon, forming a part of this specification, in which—

The figure represents a perspective view of a device, with a portion of the same broken away, embodying my invention.

A represents a block, and B the pulley, of which there may be any desired number, of the usual construction. D represents the strap or band, bent in such manner as to form the head C and rigid arm E in one piece. F F represent lugs firmly attached to the strap or band D, between which is hinged or pivoted the slotted pawl G. The slot in said pawl is made to correspond in form to the upper portion of the perforation $a$ in the lower part of the rigid arm E, and so hinged or pivoted as to close a portion of the perforation in the arm E when in position, as shown by the dotted lines, for the purpose of securing the chain, as hereafter described. H represents an eye formed upon or secured to the band or strap D. I represents a chain, provided at one end with a hook, J. K represents a trip-line secured to the pawl G, passing through the eye H and extending upward, as shown.

The operation of my invention is as follows: The chain I is taken, and the end with the hook J lowered, and the hook caught to the object to be raised. The free end of the chain is then passed through the perforation $a$ in arm E, and through the slot in the pawl G, and through the eye H, as shown. The block A is then arranged in the usual manner with another block and rope, and the block A is lowered down as near the hook J as desired, the chain passing through the perforation $a$, pawl G, and eye H as the block A is lowered. Power is then applied to the block in the usual manner. As the block commences to rise the chain I is slackened, and, being drawn tight from the hook end by the upward motion of the block, the pawl G is drawn down by the chain to the position represented by the dotted lines, and the chain thus held firmly, so that it cannot slip through the perforation $a$ in the arm E while the object to which the hook J is attached is being raised. If, for any purpose, it is desired to release the chain, so that it may pass through the perforation in the arm E and raise the block without the object to which the hook is attached, it may be done by pulling upward upon trip-line K, which raises the pawl and releases the chain.

The advantages presented by my invention over others are that it is more simple in construction and more certain in operation, as the upward motion of the block binds the chain.

Having thus fully described my invention, what I claim, and desire to secure by Letters Patent, is—

A block, A, provided with the perforated rigid arm E, slotted hinged pawl G, eye H, in combination with the chain I and trip-line K, substantially as and for the purpose specified.

EDWARD A. BARRETT.

Witnesses:
M. HAXTUN,
WM. B. TAYLOR.